US011954758B2

(12) United States Patent
Du et al.

(10) Patent No.: US 11,954,758 B2
(45) Date of Patent: Apr. 9, 2024

(54) DYNAMIC WAVE PAIRING

(71) Applicant: QUALCOMM Incorporated, San Diego, CA (US)

(72) Inventors: Yun Du, San Diego, CA (US); Andrew Evan Gruber, Arlington, MA (US); Zilin Ying, San Diego, CA (US); Chunling Hu, Campbell, CA (US); Baoguang Yang, Fremont, CA (US); Yang Xia, San Diego, CA (US); Gang Zhong, San Diego, CA (US); Chun Yu, Rancho Santa Fe, CA (US); Eric Demers, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/652,478

(22) Filed: Feb. 24, 2022

(65) Prior Publication Data

US 2023/0267567 A1 Aug. 24, 2023

(51) Int. Cl.
*G06T 1/20* (2006.01)
*G06F 9/50* (2006.01)

(52) U.S. Cl.
CPC .............. *G06T 1/20* (2013.01); *G06F 9/505* (2013.01)

(58) Field of Classification Search
None
See application file for complete search history.

(56) References Cited

U.S. PATENT DOCUMENTS

| 11,204,765 | B1 | 12/2021 | Du |
| 2019/0278605 | A1* | 9/2019 | Emberling .......... G06F 9/30101 |
| 2020/0312006 | A1 | 10/2020 | Du et al. |
| 2020/0410626 | A1* | 12/2020 | Du ........................ G06T 1/20 |
| 2021/0303481 | A1* | 9/2021 | Ray .......................... G06T 1/20 |
| 2023/0102843 | A1* | 3/2023 | Vishnuswaroop Ramesh ............ G06F 9/5016 718/104 |

OTHER PUBLICATIONS

Sebastian Aaltonen, "Optimizing GPU occupancy and resource usage with large thread groups" AMD GPUOPEN, May 24, 2017, https://gpuopen.com/learn/optimizing-gpu-occupancy-resource-usage-large-thread-groups/ (Year: 2017).*
Ananthanarayanan G., et al., "PACMan: Coordinated Memory Caching for Parallel Jobs", USENIX, The Advanced Computing Systems Association, Apr. 11, 2013, pp. 1-14, XP061014298, [retrieved on Apr. 11, 2013].
International Search Report and Written Opinion—PCT/US2023/012847—ISA/EPO—dated Jul. 5, 2023.

* cited by examiner

*Primary Examiner* — Tize Ma
(74) *Attorney, Agent, or Firm* — Procopio, Cory, Hargreaves & Savitch

(57) ABSTRACT

This disclosure provides systems, devices, apparatus, and methods, including computer programs encoded on storage media, for dynamic wave pairing. A graphics processor may allocate one or more GPU workloads to one or more wave slots of a plurality of wave slots. The graphics processor may select a first execution slot of a plurality of execution slots for executing the one or more GPU workloads. The selection may be based on one of a plurality of granularities. The graphics processor may execute, at the selected first execution slot, the one or more GPU workloads at the one of the plurality of granularities.

30 Claims, 11 Drawing Sheets

| Pixel thread #0-1 | Pn $HR_{1,2}$ | P(n+1) $HR_{1,2}$ | ... $HR_{1,2}$ | $HR_{1,2}$ | $HR_{1,2}$ | ... $HR_{1,2}$ | P(2n-2) $HR_{1,2}$ | P(2n-1) $HR_{1,2}$ | GPR layout #1 |
| | Pn $HR_{0,2}$ | P(n+1) $HR_{0,2}$ | ... $HR_{0,2}$ | $HR_{0,2}$ | $HR_{0,2}$ | ... $HR_{0,2}$ | P(2n-2) $HR_{0,2}$ | P(2n-1) $HR_{0,2}$ | |
| ... | | | | | | | | | |
| Pixel thread #0-0 | P0 $HR_{0,0}$ | P1 $HR_{0,0}$ | ... $HR_{0,0}$ | $HR_{0,0}$ | $HR_{0,0}$ | ... $HR_{0,0}$ | P(n-2) $HR_{0,0}$ | P(n-1) $HR_{0,0}$ | GPR layout #0 |
| | P0 $HR_{1,0}$ | P1 $HR_{1,0}$ | ... $HR_{1,0}$ | $HR_{1,0}$ | $HR_{1,0}$ | ... $HR_{1,0}$ | P(n-2) $HR_{1,0}$ | P(n-1) $HR_{1,0}$ | |

FIG. 8

DYNAMIC WAVE PAIRING

TECHNICAL FIELD

The present disclosure relates generally to processing systems, and more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor may be configured to convert digital information received from a CPU to analog values and may issue commands to a display panel for displaying the visual content. A device that provides content for visual presentation on a display may utilize a CPU, a GPU, and/or a display processor.

Current techniques may not address the inability of a compiler for a GPU to always find the optimal wave size based on the shader and performance statistics. There is a need for techniques that improve the flexibility in wave execution granularity.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may allocate one or more GPU workloads to one or more wave slots of a plurality of wave slots. The apparatus may select a first execution slot of a plurality of execution slots for executing the one or more GPU workloads. The selection may be based on one of a plurality of granularities. The apparatus may execute, at the selected first execution slot, the one or more GPU workloads at the one of the plurality of granularities.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a diagram illustrating a GPR layout in accordance with one or more techniques of this disclosure.

DETAILED DESCRIPTION

Figure 1:
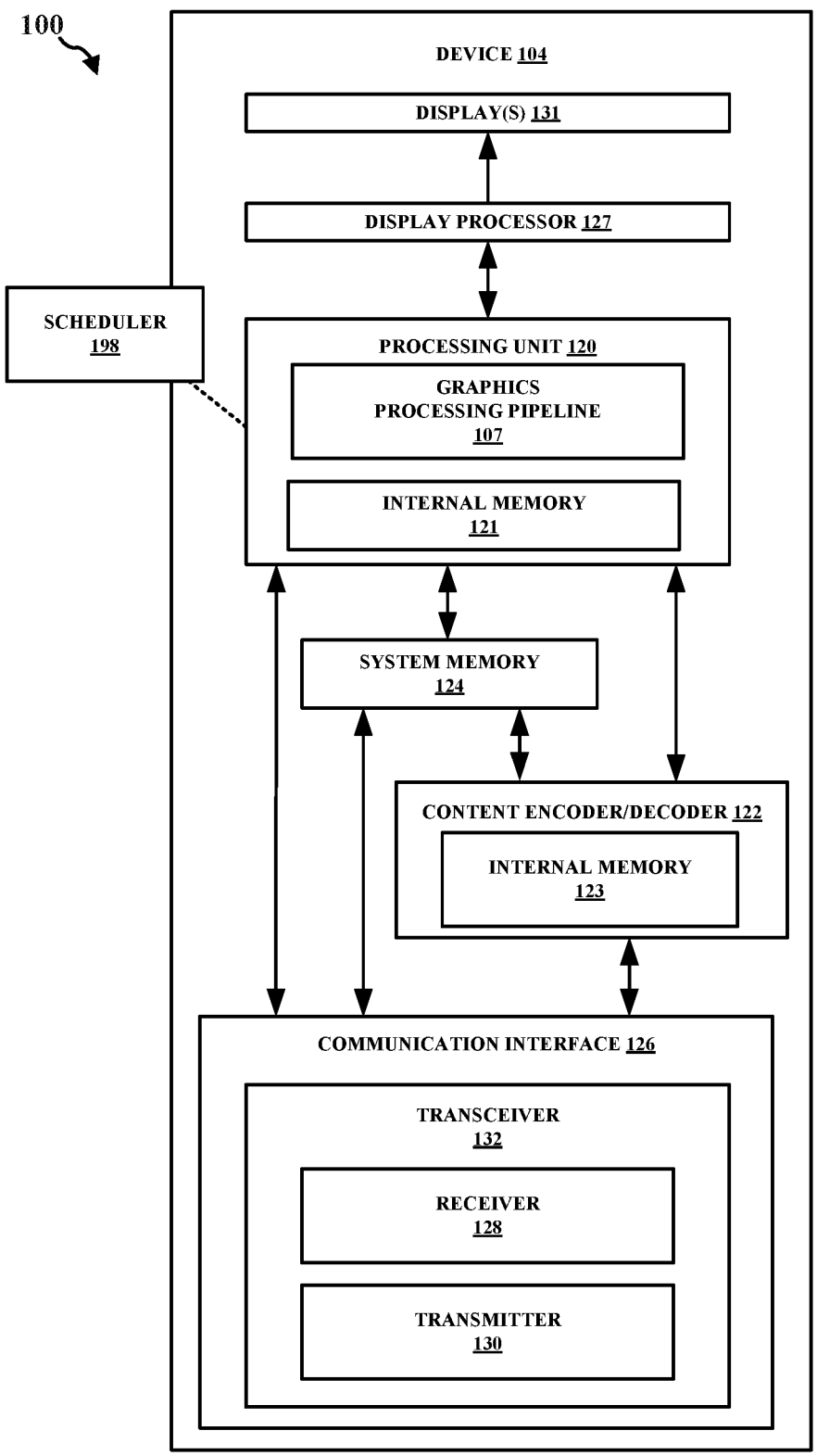
FIG. 1 is a block diagram that illustrates an example content generation system in accordance with one or more techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, processing systems, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOCs), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

The term application may refer to software. As described herein, one or more techniques may refer to an application (e.g., software) being configured to perform one or more functions. In such examples, the application may be stored in a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

In one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to "graphical content," an "image," etc., regardless of whether the terms are used as an adjective, noun, or other parts of speech. In some examples, the term "graphical content," as used herein, may refer to a content produced by one or more processes of a graphics processing pipeline. In further examples, the term "graphical content," as used herein, may refer to a content produced by a processing unit configured to perform graphics processing. In still further examples, as used herein, the term "graphical content" may refer to a content produced by a graphics processing unit.

A compiler may select a wave size (e.g., 1× or 2×) based on the shader type and performance statistics, and may communicate with the driver to set the streaming processor (SP) wave size context register. However, because the shader execution is highly dynamic, it may be difficult to always select the optimal wave size (e.g., the wave size associated with a shorter overall execution time). In one or more aspects, the compiler's role in selecting the wave size may be eliminated. A uniform 1× wave granularity in GPR allocation may be used. The wave size may be changed dynamically per instruction during execution time. Accordingly, the instruction fetch may be more efficient as a single instruction may be executed for two or more different waves. Memory and cache utilization may be more efficient as texture processing and load/store operations may be executed on paired or grouped waves in a single region in close proximity.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of a SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components (e.g., a communication interface 126, a transceiver 132, a receiver 128, a transmitter 130, a display processor 127, and one or more displays 131). Display(s) 131 may refer to one or more displays 131. For example, the display 131 may include a single display or multiple displays, which may include a first display and a second display. The first display may be a left-eye display and the second display may be a right-eye display. In some examples, the first display and the second display may receive different frames for presentment thereon. In other examples, the first and second display may receive the same frames for presentment thereon. In further examples, the results of the graphics processing may not be displayed on the device, e.g., the first display and the second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing using a graphics processing pipeline 107. The content encoder/decoder 122 may include an internal memory 123. In some examples, the device 104 may include a processor, which may be configured to perform one or more display processing techniques on one or more frames generated by the processing unit 120 before the frames are displayed by the one or more displays 131. While the processor in the example content generation system 100 is configured as a display processor 127, it should be understood that the display processor 127 is one example of the processor and that other types of processors, controllers, etc., may be used as substitute for the display processor 127. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 may be communicatively coupled to the system memory 124 over a bus. In some examples, the processing unit 120 and the content encoder/decoder 122 may be communicatively coupled to the internal memory 121 over the bus or via a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, static random access memory (SRAM), dynamic random access memory (DRAM), erasable programmable ROM (EPROM), EEPROM, flash memory, a magnetic data media or an optical storage media, or any other type of memory. The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a CPU, a GPU, GPGPU, or any other processing unit that may be configured to perform graphics processing. In some examples, the processing unit 120 may be integrated into a motherboard of the device 104. In further examples, the processing unit 120 may be present on a graphics card that is installed in a port of the motherboard of the device 104, or may be otherwise incorporated within a peripheral device configured to interoperate with the device 104. The processing unit 120 may include one or more processors, such as one or more microprocessors, GPUs, ASICs, FPGAs, arithmetic logic units (ALUs), DSPs, discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, and/or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a scheduler 198 configured to allocate one or more GPU workloads to one or more wave slots of a plurality of wave slots. The scheduler 198 may be configured to select a first execution slot of a plurality of execution slots for executing the one or more GPU workloads. The selection may be based on one of a plurality of granularities. The scheduler 198 may be configured to execute, at the selected first execution slot, the one or more GPU workloads at the one of the plurality of granularities. Although the following description may be focused on graphics processing, the concepts described herein may be applicable to other similar processing techniques.

A device, such as the device 104, may refer to any device, apparatus, or system configured to perform one or more techniques described herein. For example, a device may be a server, a base station, a user equipment, a client device, a station, an access point, a computer such as a personal computer, a desktop computer, a laptop computer, a tablet computer, a computer workstation, or a mainframe computer, an end product, an apparatus, a phone, a smart phone, a server, a video game platform or console, a handheld device such as a portable video game device or a personal digital assistant (PDA), a wearable computing device such as a smart watch, an augmented reality device, or a virtual reality device, a non-wearable device, a display or display device, a television, a television set-top box, an intermediate network device, a digital media player, a video streaming device, a content streaming device, an in-vehicle computer, any mobile device, any device configured to generate graphical content, or any device configured to perform one or more techniques described herein. Processes herein may be described as performed by a particular component (e.g., a GPU) but in other embodiments, may be performed using other components (e.g., a CPU) consistent with the disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
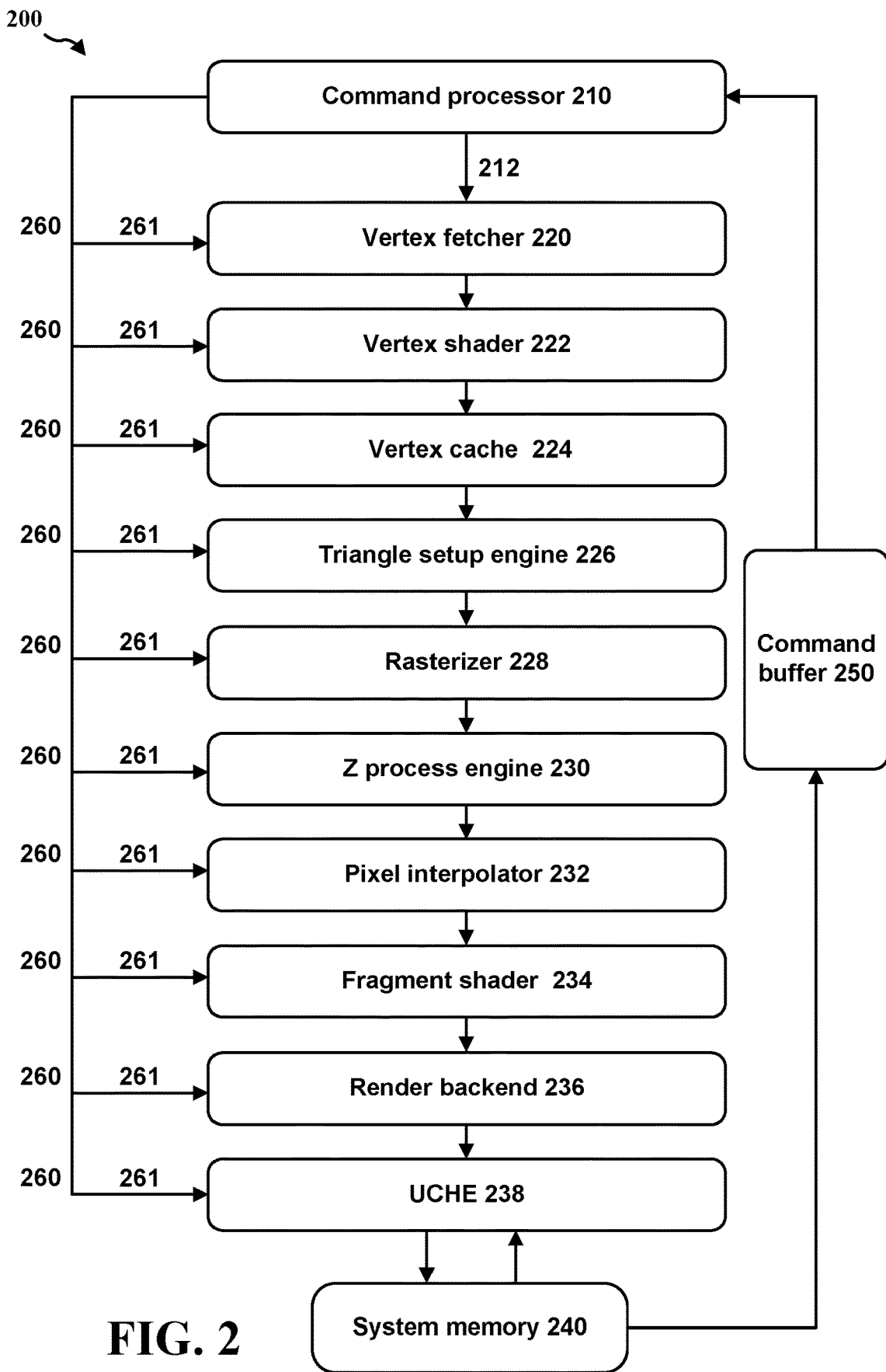
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, L2 cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1. For example, if a command buffer include 3 draws, the command buffer may include following data, in this order: draw #0 context register, draw call #0, draw #1 context register, draw call #1, draw #2 context register, and draw call #2.

Aspects described herein may relate to multi-threaded streaming processors (e.g., also referred to as streaming processors), which can be a type of processor(s) in a device (e.g., a GPU) or can be included in a processor. In one or more configurations, a streaming processor may be configured to obtain and schedule execution of instructions associated with threads, and may include, or have access to, a group of registers (e.g., general purpose registers (GPRs)). The GPRs may include one or more registers (e.g., a block of GPRs, a GPR space, a GPR footprint, etc.) that may store (e.g., temporarily store) data associated with execution of the instructions, and may be volatile or non-volatile memory. Additionally, the streaming processor may include one or more execution units (EUs) (e.g., arithmetic logic units (ALUs)) to perform computations, one or more units associated with memory operations, etc.

A streaming processor may execute a multitude of threads. Such threads may, in some instances, be grouped together according to particular code (e.g., instructions) and the grouped threads can be executed in parallel. For instance, a group of threads (e.g., a warp, a wavefront, a wave, etc., hereinafter referred to as a wave) may include a particular number of threads, with each thread repeatedly executing a same portion of code, such as a shader (e.g., instructions associated with rendering an image in specific, unique ways) or a kernel (e.g., a compute kernel). The streaming processor may execute, in parallel, (1) a multitude of threads and/or (2) a multitude of groups of threads, and the techniques described herein may be applied in any case. As an example, the streaming processor may execute a multitude of groups of threads, with each group of threads corresponding to execution of a respective portion of code. For instance, the streaming processor may interleave between the groups of threads, such that each group may be executed. As another example, the streaming processor may execute a multitude of threads, with each thread corresponding to execution of a respective portion of code. For convenience, a thread may be referred to herein as being a particular thread or a group of threads, both associated with execution of a particular portion of code.

In a streaming processor, texture operations may have a relatively long latency. Latency may be a significant aspect of the performance of the graphics processor. Such latency can be mitigated by having more threads executing on the GPU, so that some threads may be executing ALU operations while others are waiting for the texture operation to complete. This may be referred to as 'latency hiding.' Additionally, wave slots may be physical storage used by a streaming processor to schedule work for an EU (e.g., an ALU). A "wave" may represent the smallest unit of scheduled work for the EU and may include multiple threads (e.g., 64 threads).

Figure 3:
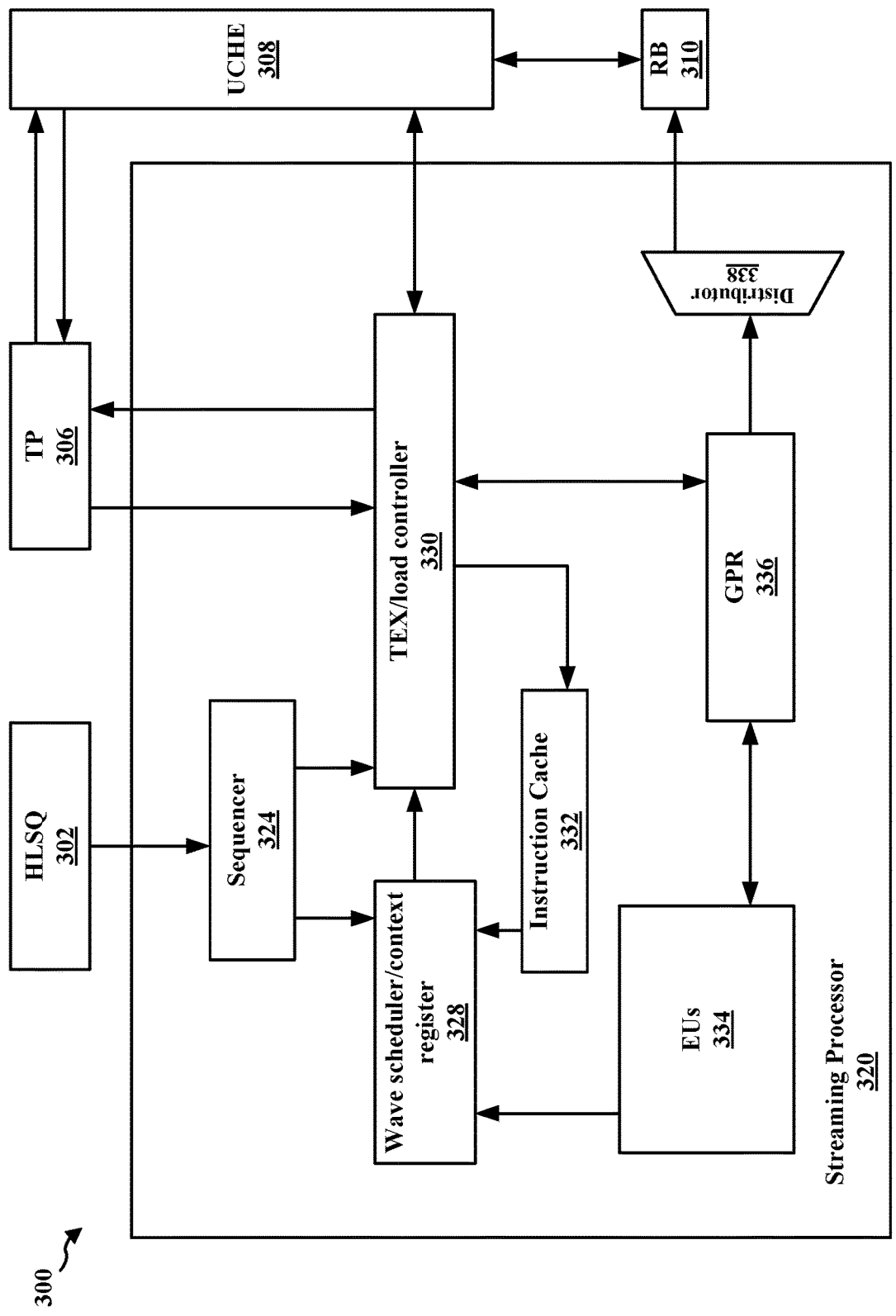
FIG. 3 illustrates an example GPU in accordance with one or more techniques of this disclosure

FIG. 3 illustrates an example GPU 300 in accordance with one or more techniques of this disclosure. More specifically, FIG. 3 illustrates a streaming processor system in GPU 300. As shown in FIG. 3, GPU 300 includes high level sequencer (HLSQ) 302, texture processor (TP) 306, UCHE 308, and RB 310. GPU 300 also includes streaming processor 320, sequencer 324, wave scheduler and context register 328, texture unit (TEX) or load controller 330, instruction cache 332, EUs 334, general purpose register (GPR) 336, and distributor 338. The wave scheduler and context register 328 may also include one or more wave slots.

As shown in FIG. 3, the streaming processor 320 may include function units or blocks, e.g., EUs 334 or sequencer 324. EUs 334 may execute or process some of the functions of the GPU. The sequencer 324 may allocate resources and local memory, as well as store local memory. Also, the sequencer 324 may allocate wave slots and any associated GPR 336 space. For example, the sequencer 324 may allocate wave slots or GPR 336 space when the HLSQ 302 issues a pixel tile workload to the streaming processor 320. In some aspects, the wave scheduler 328 may execute a pixel shader or issue instructions to the EUs 334. The EUs 334 may also include an ALU and/or an elementary function unit (EFU). Further, the TEX or load controller 330 may be considered an execution unit.

Additionally, the TEX or load controller 330 may correspond to one or multiple units. For instance, the TEX 330 may perform a texture fetch and/or the load controller 330 may perform a memory fetch. In some aspects, the instruction cache 332 may store a workload or program to be executed. As further shown in FIG. 3, the streaming processor 320 may interface with the outside blocks, e.g., HLSQ 302, TP 306, UCHE 308, and RB 310. These blocks 302, 306, 308, and 310 may utilize user provided input and/or the streaming processor may output results (e.g., metadata such as texture buffer generated by the streaming processor based on the user provided input) to these blocks or the memory. Further, in some examples, the streaming processor may retrieve suitable or appropriate data from the memory.

As shown in FIG. 3, each unit or block in GPU 300 may send data or information to other blocks. For instance, HLSQ 302 may send vertex threads, vertex attributes, pixel threads, and/or pixel attributes to the sequencer 324. TP 306 may send texture data to the TEX 330. TP 306 may also receive texture requests from TEX 330. Further, TP 306 may send requests to and receive texture elements from UCHE 308. UCHE 308 may also send memory to and receive memory from TEX 330, as well as send memory to and receive memory from RB 310. Also, RB 310 may receive an output in the form of color from GPR 336, e.g., via distributor 338. VPC 312 may also receive output in the form of vertices from GPR 336, e.g., via distributor 338. GPR 336 may also send temporary data to and receive temporary data from EUs 334. Moreover, EUs 334 may send address or predicate information (the predicate information may relate to a predicate, which may be a condition the outcome of which may affect the control flow) to the wave scheduler 328. TEX or load controller 330 may also send/receive data to/from GPR 336. Further, TEX or load controller 330 may update information to the instruction cache 332. TEX or load controller 330 may also receive attribute data from sequencer 324 and synchronization information from wave scheduler 328. Additionally, wave scheduler 328 may receive decode information (e.g., an instruction type decoded from an instruction, which may inform the SP (in particular, the wave scheduler) as to the execution unit to which the instruction may be issued.) from instruction cache 332 and thread data from sequencer 324.

As mentioned above, the GPU 300 may process workloads, e.g., a pixel or vertex workload. In some aspects, these workloads may correspond to, or be referred to as, waves or wave formations. For instance, each workload or operation may use a group of vertices or pixels as a wave. For example, each wave may include a number of different components (threads, fibers) to perform a workload or operation, e.g., 64 or 128 components (threads, fibers). In some instances, GPU 300 may send a wave formation, e.g., a pixel or vertex workload, to the wave scheduler 328 for execution. For a vertex workload, the GPU may perform a vertex transformation. For a pixel workload, the GPU may perform a pixel shading or lighting.

As indicated above, each of the aforementioned processes or workloads, e.g., the processes or workloads in the streaming processor 320, may include a wave formation. For example, during a vertex workload, a number of vertices, e.g., three vertices, may form a triangle or primitive. The GPU may then perform a transformation of these vertices, such that the vertices may transform into a wave. In order to perform this transformation, GPUs may utilize a number of wave slots, e.g., to help transform the vertices into a wave. Further, in order to execute a workload or program, the GPU may also allocate the GPR space, e.g., including a temporary register to store any temporary data. Additionally, the sequencer 324 may allocate the GPR 336 space and one or more wave slots in order to execute a wave. For example, the GPR 336 space and one or more wave slots may be allocated when a pixel or vertex workload is issued.

In some aspects, the wave scheduler 328 may process a pixel workload and/or issue instructions to various execution units, e.g., EUs 334. The wave scheduler 328 may also help to ensure data dependency between instructions, e.g., data dependency between ALU operands due to the pipeline latency and/or texture sample return data dependency based on a synchronization mechanism. Additionally, the wave scheduler 328 may have a load reference counter (LRC) to count outstanding texture or memory requests that are issued to the TP 306 or UCHE 308, as well as a corresponding data return request. In some aspects, if the LRC value is greater than zero, this may indicate there is outstanding data. As such, instructions that are dependent on the return of the outstanding data may not be able to execute until the LRC value decreases to zero. After the shader processing is completed, the streaming processor 320 may send the processing results to a downstream block (e.g., the RB 310).

Figure 4:
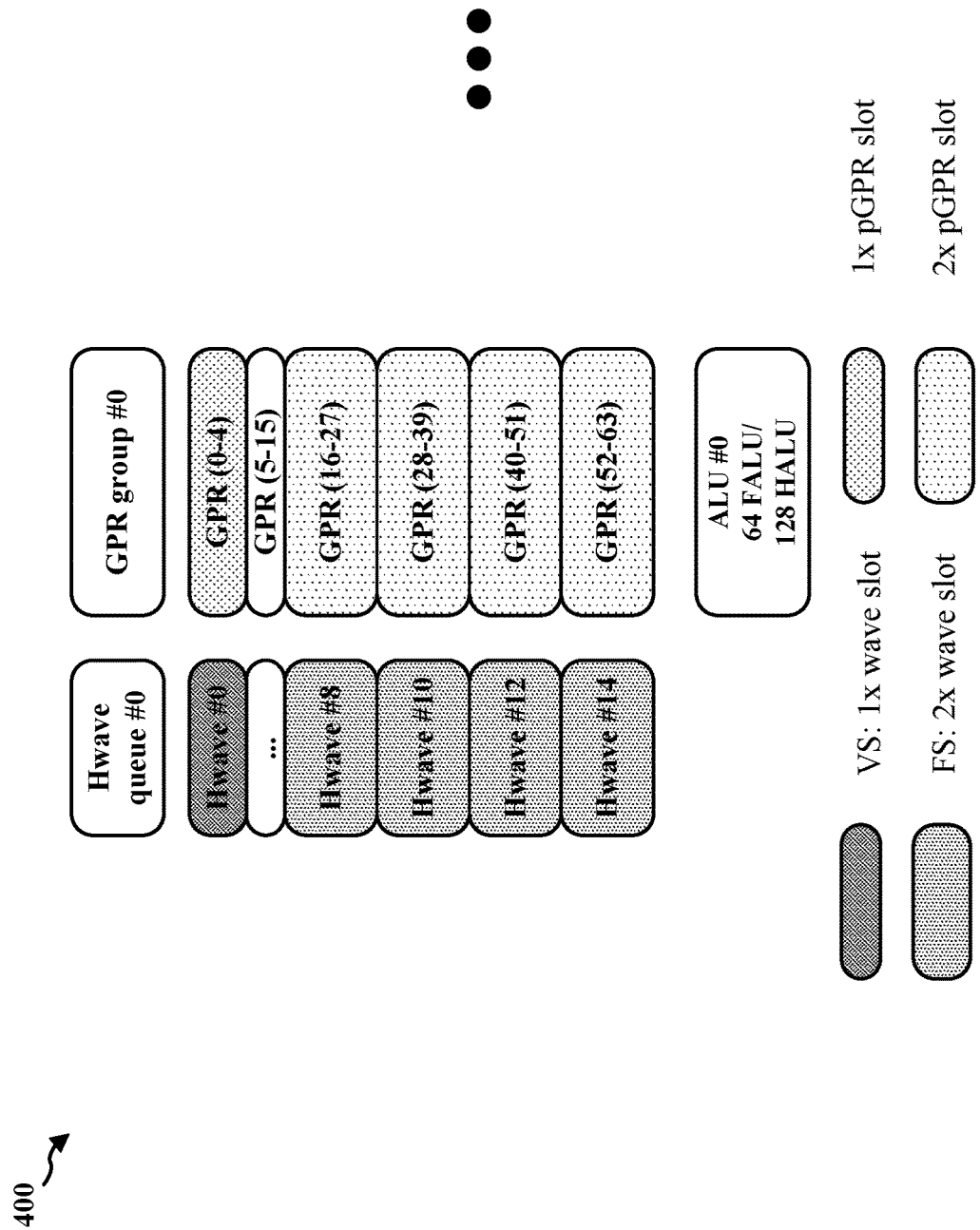
FIG. 4 is a diagram illustrating allocation of wave slots and GPRs in accordance with one or more techniques of this disclosure.

FIG. 4 is a diagram 400 illustrating allocation of wave slots and GPRs. FIG. 4 shows an example of GPR space and wave slot allocation by the sequencer 324 in FIG. 3. Two wave size options may be utilized. A wave according to the first option, which may be referred to as a 1× wave, may include 64 fibers (threads, components) per wave. A wave according to the second option, which may be referred to as a 2× wave, may include 128 fibers (threads, components) per wave. Vertex workloads may utilize the 1× wave, while pixel workloads may utilize the 2x wave. A compiler may select a wave size (e.g., 1x or 2x) based on the shader type and performance statistics, and may communicate with the driver to set the SP wave size context register.

As shown in FIG. 4, the sequencer may build a GPR slot map based on the wave sizes. In one or more configurations, the hardware wave slots (Hwave slots) and the GPRs may be divided into a number of clusters. For example, the Hwave slots and the GPRs may be divided into 2 clusters, 3 clusters, 4 clusters, etc. FIG. 4 shows such an example cluster, which may include wave slots belonging in the Hwave queue #0 (e.g., Hwave #0, Hwave #2, . . . , Hwave #14) and GPRs in the GPR group #0. Additional clusters may include additional Hwave queues and GPR groups. The wave slots and the GPR groups or sets may be statically tied one-to-one based on the shader, e.g., a vertex shader (VS) or fragment shader (FS). In other words, each wave slot may correspond to a set of GPRs. In particular, the wave slots for 1x waves (e.g., for the VS) may be tied to GPR sets with a 1x GPR footprint, and the wave slots for 2x waves (e.g., for the FS) may be tied to GPR sets with a 2x GPR footprint. In the middle, GPRs 5-15 (i.e., 11 GPR spaces) may not be utilized by 2x waves (e.g., pixel workload waves). Each cluster of wave slots and GPR sets may be associated with an ALU. In one or more examples, each ALU may perform 64 full precision ALU operations (e.g., 32-bit operations) or 128 half precision ALU operations (e.g., 16-bit operations) per cycle. The specific configuration of the wave slots and the GPRs illustrated in FIG. 4 is exemplary and does not limit the disclosure. Although one Hwave queue, one GPR group, and one ALU are illustrated, the disclosure is not so limited. For example, two Hwave queues, two GPR groups, and two ALUs may be provided. In other different configurations, more than two Hwave queues, more than two GPR groups, and more than two ALUs may be provided.

Figure 5:
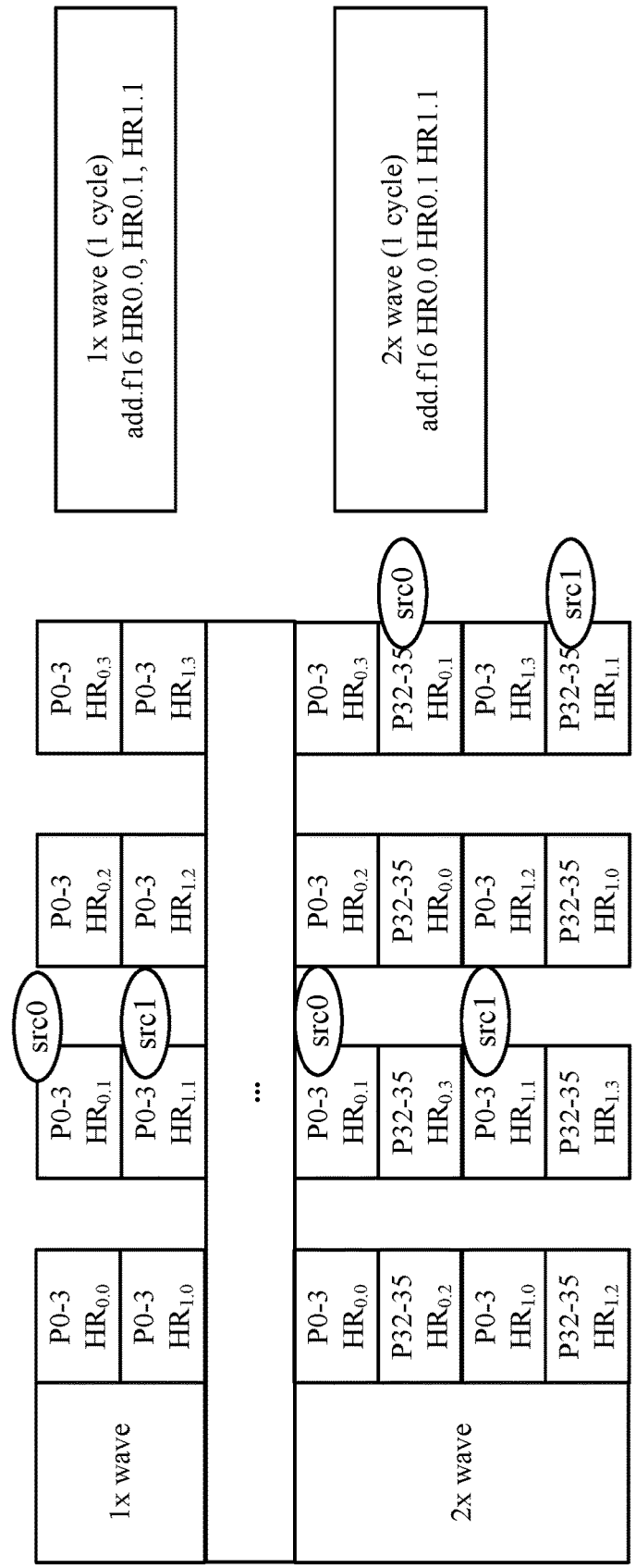
FIG. 5 is a diagram illustrating a GPR layout in accordance with one or more techniques of this disclosure.

FIG. 5 is a diagram 500 illustrating an example GPR layout. As shown in FIG. 5, wave slots for 1x waves and wave slots for 2x waves may be associated with different addressing schemes and layouts. An instruction, such as add.f16 HR0.0, HR0.1, HR1.1 (floating 16 format data addition, where HR0.0 (destination operand)=HR0.1 (source operand 0, or src0)+HR1.1 (source operand 1, or src1)) may be executed. An HR may refer to a half precision register (which may hold 16 bits of data). P may stand for a pixel. For example, P0-3 may correspond to pixels 0 to 3, and P32-35 may correspond to pixels 32 to 35. In FIG. 5, HR0.1 and HR1.1 may be in the same physical GPR bank. If the GPR bank has 2 read ports, the hardware may provide one read port for P0-3 src0 (source 0) (HR0.1) read and one read port for P0-3 src1 (source 1) (HR1.1) read. Accordingly, a GPR bank conflict may be avoided when half precision ALU operations are performed on 2x waves at a 2x rate. However, if P32-35 are using the same GPR bank as P0-3, unless 4 read ports are provided for the GPR bank, P0-3 and P32-35 may not be executed in one cycle. The specific GPR layout illustrated in FIG. 5 is exemplary and does not limit the disclosure. Although a 1x wave layout and a 2x wave layout are illustrated, the disclosure is not so limited. For example, GPR layouts for waves of other sizes may also be provided. In some configurations, one GPR layout or group may be provided. In other different configurations, more than two GPR layouts or groups may be provided.

A comparison between the example 1x wave and the 2x wave may be summarized in Table 1 below.

TABLE 1

|  | 1x wave | 2x wave |
|---|---|---|
| Fiber per wave | n | 2n |
| Full ALU rate | 1x | 1x |
| Half ALU rate | 1x | 2x |
| GPR allocation per wave | 1x | 2x |
| Instruction cache fetch frequency | 2x | 1x |
| Max fiber capacity per uSPTP | 1x | 2x |
| Execution divergency | Less |  |
| Latency hiding capacity |  | Better |
| TPL1 miss rate | Lower |  |
| GPR space waste | Less |  |

As shown in the table, for half (single) precision ALU operations, the GPU may execute one instruction in one cycle with 1x waves, and may execute one instruction in two cycles with 2x waves. The throughput may be the same. The main difference is that each cluster may parallelize 128 half precision ALU operations, therefore, the 1x wave may utilize 50% of ALU units or ALU throughput per issue, while the 2x wave may utilize 100% of the ALU units or the ALU throughput.

For GPR allocation, the 1x wave may be associated with less fragmentation than the 2x wave. For fetches from the instruction cache, twice as many fetches may be performed for the 1x wave as for the 2x wave. A maximum of 16 physical wave slots may be inside each micro SP (uSPTP). A 2x wave may hold up to twice as many pixels as a 1x wave.

The 1x wave may be associated with less execution divergency compared to a 2x wave (e.g., it may be less likely for a 1x wave to be associated with both an 'if' block and an 'else' block compared to a 2x wave). Accordingly, the 1x wave may be suitable for complex shaders (e.g., the ray tracing traversal shader). On the other hand, the 2x wave may be suitable for hiding latency because more pixels may be issued with the 2x wave (compared to a 1x wave) to hide a longer memory fetch latency.

The 1x wave may be associated with a lower TP L1 cache (TPL1) miss rate compared to a 2x wave because the wave tile size is smaller in a 1x wave than in a 2x wave. Further, the 1x wave may be associated with less GPR space waste compared to a 2x wave because the 1x wave is associated with less fragmentation than in a 2x wave. The references to the 1x wave and the 2x wave are exemplary and do not limit the disclosure. The description herein associated with the 1x wave and the 2x wave may apply more generally to, for example, the smaller wave and the larger wave.

As mentioned above, the compiler may select the wave size based on shader statistics. However, because the shader execution is highly dynamic, it may be difficult to always select the optimal wave size (e.g., the wave size associated with a shorter overall execution time). In one simulation conducted with commonly used shaders, a compiler may select the optimal wave size approximately 60% of the time. Furthermore, shader execution may become even more dynamic for complex shaders, and the optimal wave size may change per instruction or per wave. For example, it may be beneficial to use the 1x wave at a branching block, a sample (texture) block, etc., and to use the 2x wave otherwise.

Figure 6:
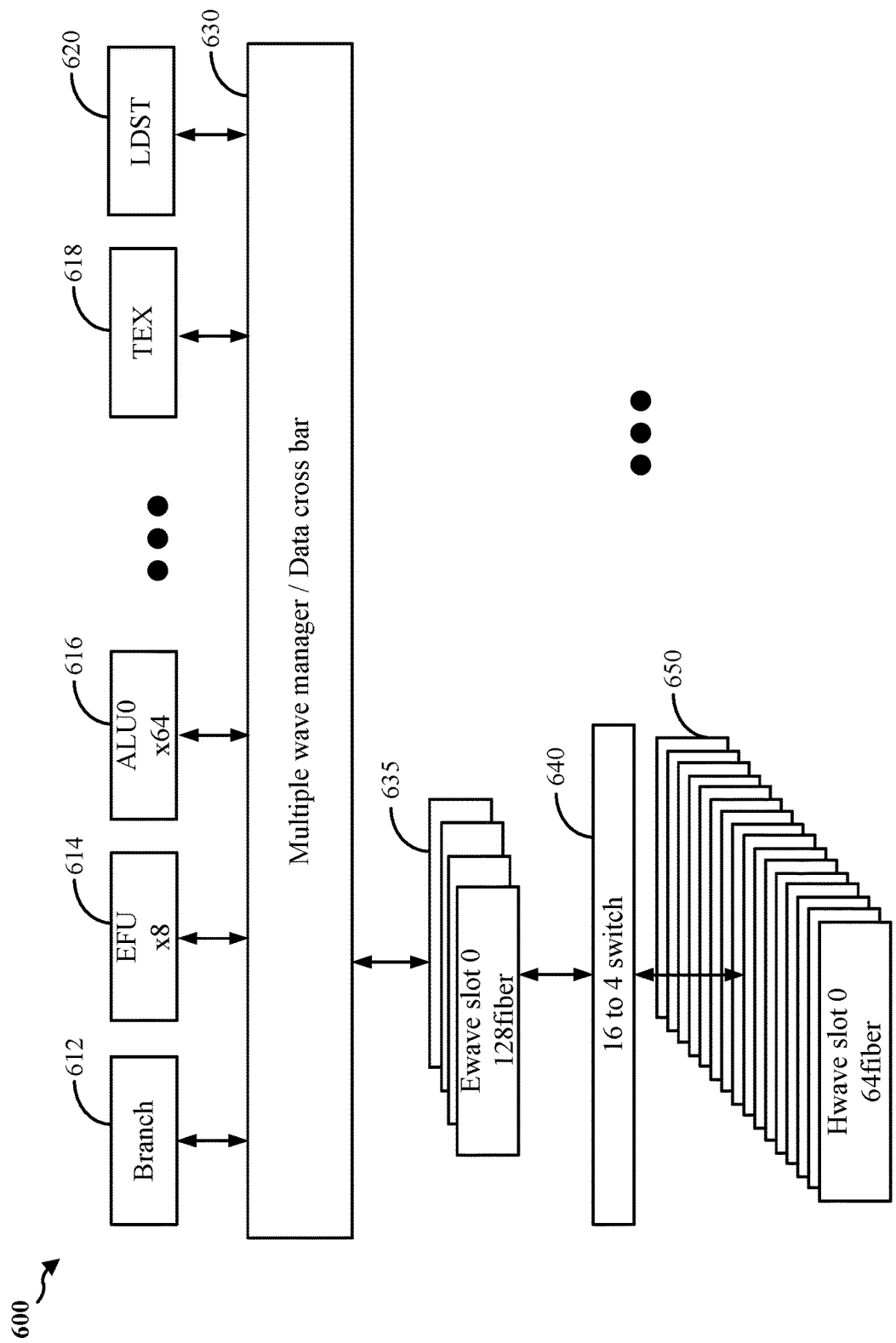
FIG. 6 illustrates an example GPU in accordance with one or more techniques of this disclosure.

FIG. 6 illustrates an example GPU 600 in accordance with one or more techniques of this disclosure. As shown in FIG. 6, GPU 600 includes a number of execution units, e.g., flow control branch 612, EFU 614, ALU 616, TEX 618, and load store (LDST) 620. GPU 600 may include a number of additional execution units, as execution units 612-620 are merely an example and any combination or order of execution units may be used by GPUs herein. GPU 600 may also include a data cross bar 630, which may also be referred to as a multiple wave manager 630. Further, GPU 600 includes a number of wave slots (Hwave slots), e.g., wave slots 650. For ease of illustration, wave slots are not assigned individual reference numerals in FIG. 6. GPU 600 may include any number of different wave slots, as wave slots 650. GPU 600 may also include a number of execution slots (Ewave slots), e.g., execution slots 635. Execution slots are not assigned individual reference numerals in FIG. 6. GPU 600 may include any number of different execution slots, as execution slots 635 are merely an example. In general, GPU 600 may include fewer execution slots 635 than wave slots 650. In some aspects, execution slots 635 and wave slots 650 may be part of a wave scheduler.

As shown in FIG. 6, each component in GPU 600 may communicate with a number of other components. For instance, each of the execution units 612-620 may send or receive data or instructions, e.g., requests or grants, to/from the data cross bar 630. Each of the execution slots 635 may send or receive data or instructions, e.g., requests or grants, to/from the data cross bar 630. Also, within a cluster, each of the execution slots may send or receive data or instructions (e.g., context registers including context states or values) to/from the wave slots via a switch (e.g., a 16-to-4 switch). For example, each of the execution slots 635 may send or receive data or instructions to/from the wave slots 650 via a 16-to-4 switch 640. Each of the execution units 612-620, e.g., flow control branch 612, EFU 614, ALU 616, TEX 618, and LDST 620, may also send or receive data or instructions to/from the execution slots 635.

The execution slots 635 and the wave slots 650 may form a hierarchical structure. GPU workload waves may be first loaded into the wave slots 650. Waves in the wave slots 650 may be selected for execution, e.g., based on a priority. The waves selected for execution may be copied from the corresponding wave slots to one or more of the execution slots 635. In particular, the associated context registers including context states or values may be copied from the corresponding wave slots to the one or more of the execution slots 635. Based on the instruction, an appropriate EU may be selected to execute the operations on the waves in the execution slots 635. Once the execution is completed or suspended, the waves may be copied back from the corresponding execution slots 635 to one or more of the wave slots 650. In particular, the associated context registers including context states or values may be copied back from the corresponding execution slots to the one or more of the wave slots 650.

As indicated above, FIG. 6 shows an SP scheduling flow. Inside the wave scheduler, the waiting wave queue may be stored in the wave slots 650, which may make up the bottom layer of the wave slot hierarchy. Input and memory data accumulation may be performed at the wave slots 650. In one or more examples, in configurations where both the 1× and the 2× wave sizes are utilized, each wave slot may physically accommodate 128 fibers, and at runtime may hold 64 fibers (i.e., a 1× wave) or 128 fibers (i.e., a 2× wave) based on the wave size setting provided by the compiler. In one configuration, each cluster may include 8 wave slots. Execution slots may be located above the wave slots in the hierarchy. In one configuration, each cluster may include 4 execution slots, each of which may physically accommodate 128 fibers. The execution slots may be configured to fetch instructions from the level 1 (L1) instruction cache and issue instructions to EUs. Within a same cluster, a switch may be located in between and connected to the wave slots and the execution slots. The switch may include switching logic to move waves into and/or out from the execution slots. In one configuration, each SP may include two such clusters to serve two ALUs/ALU clusters independently. Although one cluster is illustrated in FIG. 6, the disclosure is not so limited. In some configurations, more than one cluster may be provided. Each cluster may include a corresponding set of wave slots, a corresponding switch, a corresponding set of execution slots, and a corresponding ALU.

In one novel configuration, a uniform wave size may be utilized. For example, the uniform wave size may correspond to 64 fibers (e.g., equivalent to the 1× wave). Accordingly, each wave slot may physically accommodate 64 fibers, and at runtime may hold 64 fibers. Utilizing the existing context storage as described above, each cluster may include 16, instead of 8, wave slots. The execution slots may remain the same. In other words, each cluster may include 4 execution slots, each of which may physically accommodate 128 fibers. The specific configuration of the wave slots and the execution slots illustrated in FIG. 6 is exemplary and does not limit the disclosure.

Figure 7:
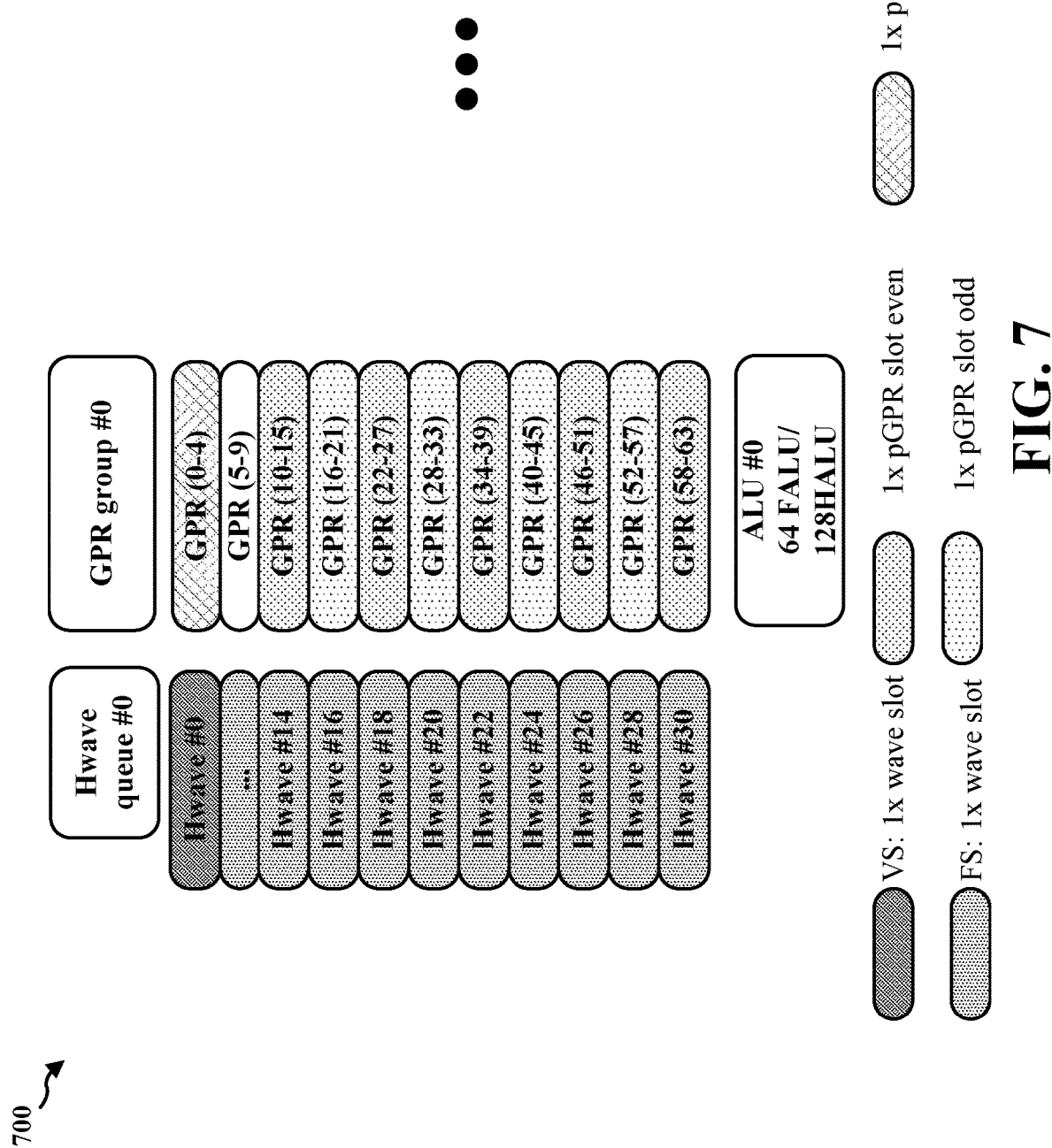
FIG. 7 is a diagram illustrating allocation of wave slots and GPRs in accordance with one or more techniques of this disclosure.

FIG. 7 is a diagram 700 illustrating example allocation of wave slots and GPRs in accordance with one or more techniques of this disclosure. In some configurations, the hardware wave slots and the GPRs may be divided into a number of clusters. For example, the hardware wave slots and the GPRs may be divided into 2 clusters, 3 clusters, 4 clusters, etc. FIG. 7 shows such an example cluster, which may include wave slots belonging in the Hwave queue #0 (e.g., Hwave #0, Hwave #2, ..., Hwave #30) and GPRs in the GPR group #0. Each cluster of wave slots and GPR sets may be associated with an ALU. In one or more examples, each ALU may perform 64 full precision ALU operations or 128 half precision ALU operations per cycle. Because all wave slots are 1× wave slots, wasted GPR space (GPR 5-9 in the illustrated example) may be reduced. Within each cluster, the wave slots and the corresponding GPRs may be divided into even (first) and odd (second) wave slots and GPRs. Therefore, the incoming waves may sequentially fill the wave slots and GPRs in an alternating even (first) and odd (second) pattern. The specific configuration of the wave slots, the GPRs, and the ALUs illustrated in FIG. 7 is exemplary and does not limit the disclosure. Although one Hwave queue, one GPR group, and one ALU are illustrated, the disclosure is not so limited. For example, two Hwave queues, two GPR groups, and two ALUs may be provided. In other different configurations, more than two Hwave queues, more than two GPR groups, and more than two ALUs may be provided.

FIG. 8 is a diagram 800 illustrating an example GPR layout in accordance with one or more techniques of this disclosure. In one or more examples, the sequencer may add tags to incoming waves to indicate two consecutive (back-to-back) incoming waves as a wave pair. The waves in a wave pair may be stored in consecutive or non-consecutive wave slots. As described above, the wave pair may adopt a first (#0) GPR layout and a second (#1) GPR layout, which may help to avoid GPR port conflict, and may allow the execution of half precision ALU operations at the 2× rate. The SP (in particular, the wave scheduler) may, based on the instruction, dynamically select whether to copy a single wave or a wave pair to each execution slot for execution. A decision on whether to copy a single wave or a wave pair may correspond to a decision on workload execution granularity. Copying a single wave to each execution slot for execution may correspond to a first (smaller) granularity. Copying a wave pair to each execution slot for execution (which may be referred to as a super wave mode execution) may correspond to a second (larger) granularity. The SP (in particular, the wave scheduler) may select the first granularity when the waves are associated with a texture (sample) block or a branching block, and may select the second granularity when the waves are not associated with a texture (sample) block or a branching block. Therefore, in one configuration, the SP (in particular, the wave scheduler) may begin to execute the waves with the second granularity (i.e., in the wave pair/super wave mode). The SP (in particular, the wave scheduler) may switch to executing the waves with the first granularity (i.e., in the single wave mode) when a branching block or a texture (sample) block is encountered. The texture block or the branching block may refer to a program segment or a group of instructions, where a texture block may refer to a group of sample instructions, and a branching block may refer to an "if-then-else" program block. In particular, with the first granularity, the SP may execute single waves sequentially in one execution slot, or may execute waves in separate (e.g., two) execution slots in parallel, where a single wave is executed in each execution slot. After the branching block or the texture (sample) block is completed, the SP (in particular, the wave scheduler) may switch back to executing the remaining waves with the second granularity (i.e., in the wave pair/super wave mode). In FIG. 8, the two GPR layouts may relate to the mapping of logical GPRs to a physical GPR bank. For example, HR0.0 of the GPR layout #0 and HR0.2 of the GPR layout #1 may use the same GPR bank to avoid the GPR bank conflict. In particular, when a wave pair associated with a same half ALU instruction (e.g., add.f16 HR0.0, HR0.1, HR1.1) is executed, and one wave in the wave pair uses the GPR layout #0 and the other wave uses the GPR layout #1, a GPR bank conflict may be avoided because the waves may be read via ports src0 and src1, respectively. The specific GPR layout illustrated in FIG. 8 is exemplary and does not limit the disclosure. Although two GPR layouts are illustrated, the disclosure is not so limited. For example, one GPR layout or group may be provided. In other different configurations, more than two GPR layouts or groups may be provided. The grouping of the waves and the associated granularities may correspond to the number of GPR layouts that may be provided. For example, instead of being grouped into wave pairs, the incoming waves may be grouped into wave groups each of which may include 3 waves, 4 waves, 5 waves, etc. The number of waves in each wave group may correspond to the number of GPR layouts that may be provided.

In the configuration described above, the ratio between the capacity of each execution slot and the capacity of each wave slot is 2:1 (e.g., 128 fibers: 64 fibers). Accordingly, two wave execution granularities are possible: a first granularity where a single wave is executed in each execution slot, and a second granularity where a wave pair is executed in each execution slot. In further configurations, various ratios between the capacity of each execution slot and the capacity of each wave slot may be used. For example, the ratio may be 4:1, 8:1, 16:1, etc. As the ratio increases, the number of possible wave execution granularities may increase as well. For example, if the ratio between the capacity of each execution slot and the capacity of each wave slot is 4:1 (e.g., 128 fibers: 32 fibers), four wave execution granularities may be possible. The four wave execution granularities may correspond, respectively, to executing one, two, three, or four waves in each execution slot. The ratios that have been described herein are merely examples. Any suitable ratio between the capacity of each execution slot and the capacity of each wave slot may be utilized.

Figure 9:
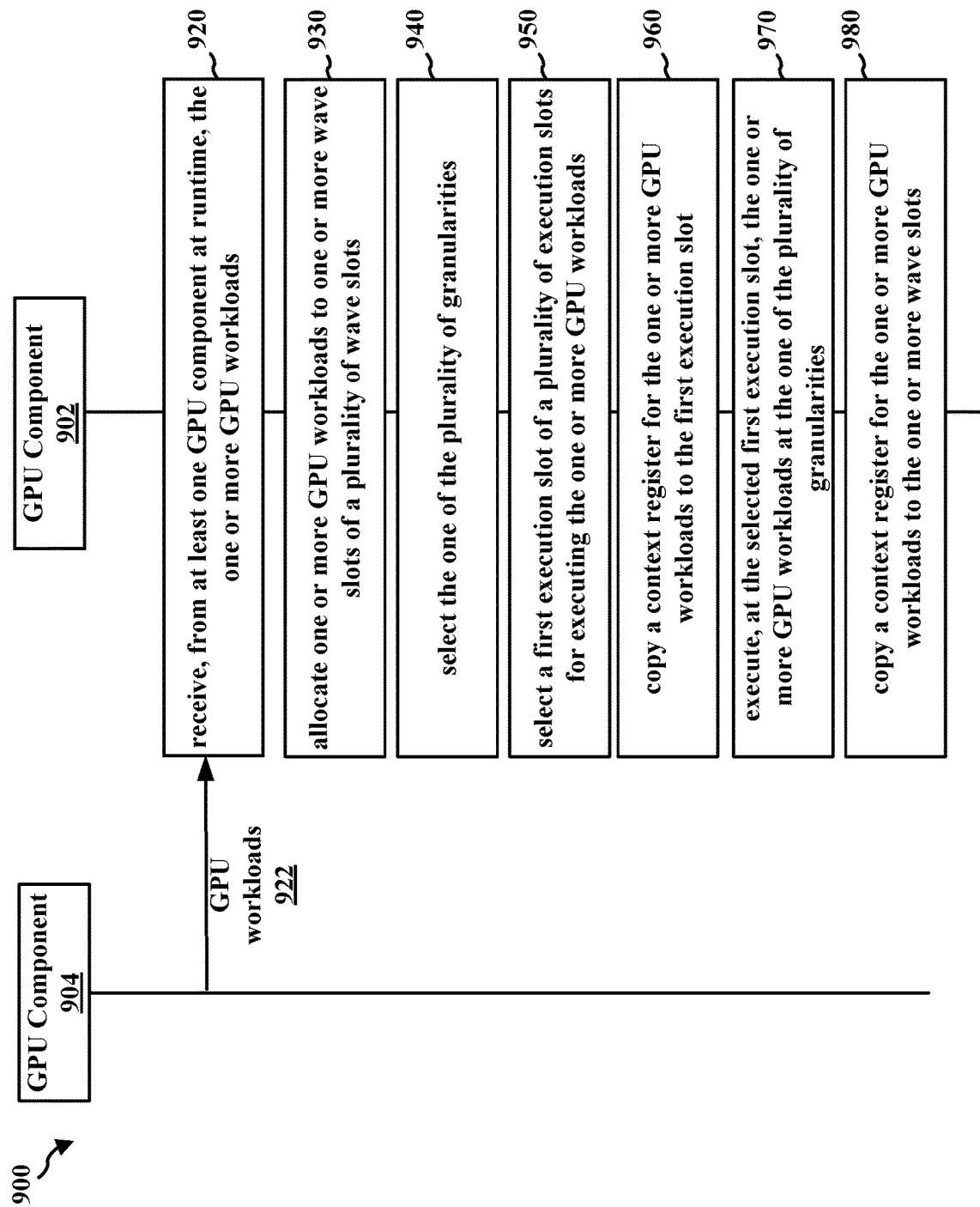
FIG. 9 is a diagram of a communication flow of an example method of graphics processing in accordance with one or more techniques of this disclosure.

FIG. 9 is a diagram illustrating a communication flow 900 of an example method of graphics processing in accordance with one or more techniques of this disclosure. The GPU component 902 may correspond to the wave scheduler 328 in FIG. 3. At 920, the GPU component 902 may receive, from at least one GPU component 904 at runtime, the one or more GPU workloads 922.

In one configuration, each GPU workload of the one or more GPU workloads 922 may include a uniform number of fibers.

At 930, the GPU component 902 may allocate one or more GPU workloads 922 to one or more wave slots of a plurality of wave slots.

In one configuration, the plurality of wave slots may include a plurality of first wave slots and a plurality of second wave slots. The one or more GPU workloads may be allocated based on the plurality of first wave slots and the plurality of second wave slots.

In one configuration, a first GPU workload of the one or more GPU workloads 922 may be allocated to a first wave slot of the plurality of first wave slots. A second GPU workload of the one or more GPU workloads 922 may be allocated to a second wave slot of the plurality of second wave slots. In one configuration, the first GPU workload and the second GPU workload may be consecutive in sequence. In one configuration, the first GPU workload and the second GPU workload may be associated with a same instruction.

In one configuration, each wave slot of the plurality of wave slots may be associated with one set of GPRs of a plurality of GPRs.

At 940, the GPU component 902 may select the one of the plurality of granularities based on whether the one or more GPU workloads 922 are associated with or are unassociated with a texture block or a branching block.

In one configuration, a first granularity may be selected as the one of the plurality of granularities when the one or more GPU workloads 922 are associated with the texture block or the branching block. In one configuration, a second granularity may be selected as the one of the plurality of granularities when the one or more GPU workloads 922 are unassociated with the texture block or the branching block. The first granularity may be smaller than the second granularity.

At 950, the GPU component 902 may select a first execution slot of a plurality of execution slots for executing the one or more GPU workloads 922. The selection may be based on one of a plurality of granularities.

At 960, the GPU component 902 may copy a context register for the one or more GPU workloads 922 to the first execution slot.

In one configuration, the context register for the one or more GPU workloads may be associated with a context state of the one or more GPU workloads.

At 970, the GPU component 902 may execute, at the selected first execution slot, the one or more GPU workloads 922 at the one of the plurality of granularities.

At 980, the GPU component 902 may copy a context register for the one or more GPU workloads to the one or more wave slots.

Figure 10:
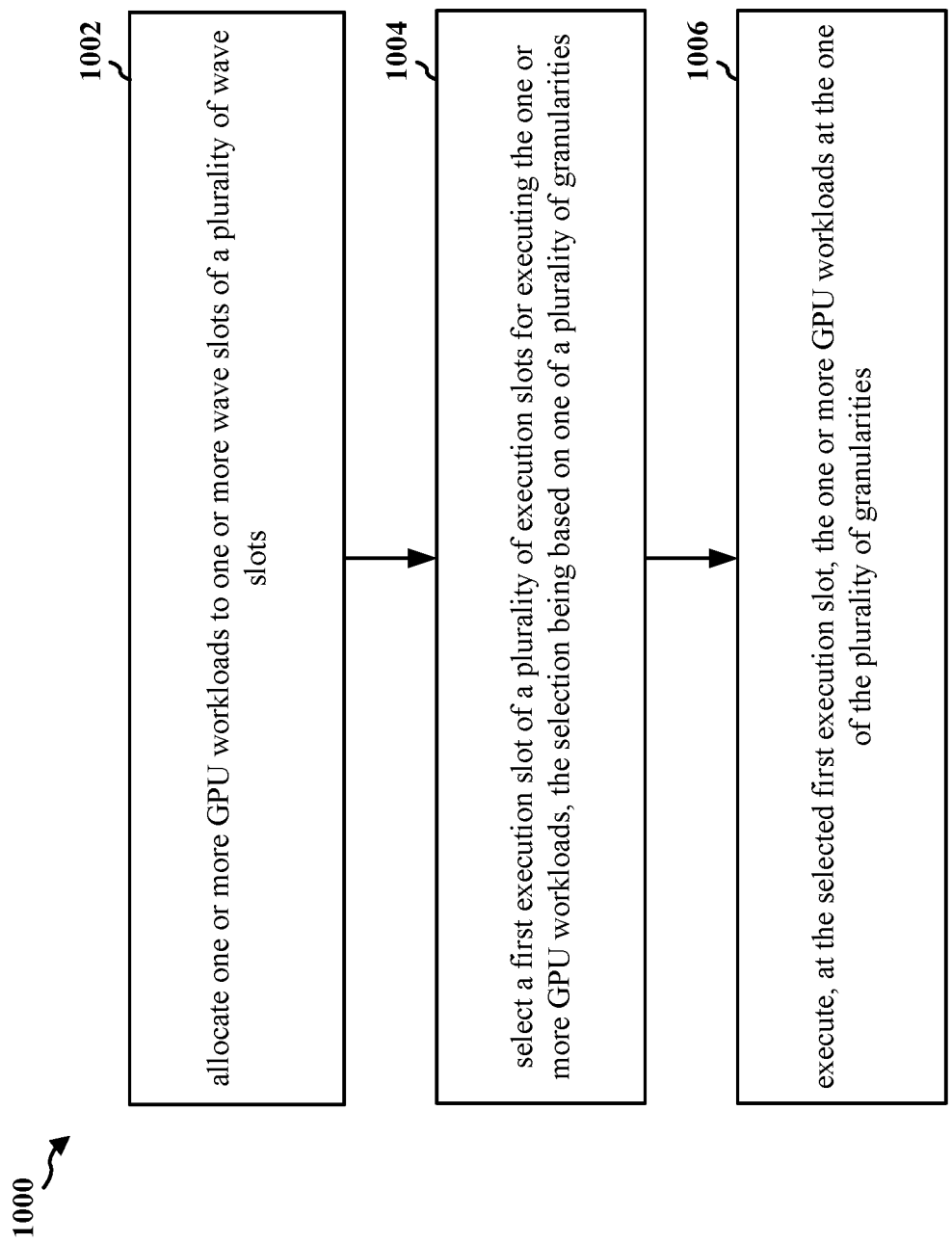
FIG. 10 is a flowchart of an example method of graphics processing in accordance with one or more techniques of this disclosure.

FIG. 10 is a flowchart 1000 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-3 and 6-8.

At 1002, the apparatus may allocate one or more GPU workloads to one or more wave slots of a plurality of wave slots, as described in connection with the examples in FIGS. 3 and 6-8. Referring to FIG. 9, at 930, the GPU component 902 may allocate one or more GPU workloads 922 to one or more wave slots of a plurality of wave slots. Further, the processing unit 120 in FIG. 1 may perform the operation 1002.

At 1004, the apparatus may select a first execution slot of a plurality of execution slots for executing the one or more GPU workloads, as described in connection with the examples in FIGS. 3 and 6-8. The selection may be based on one of a plurality of granularities. Referring to FIG. 9, at 950, the GPU component 902 may select a first execution slot of a plurality of execution slots for executing the one or more GPU workloads 922. Further, the processing unit 120 in FIG. 1 may perform the operation 1004.

At 1006, the apparatus may execute, at the selected first execution slot, the one or more GPU workloads at the one of the plurality of granularities, as described in connection with the examples in FIGS. 3 and 6-8. Referring to FIG. 9, at 970, the GPU component 902 may execute, at the selected first execution slot, the one or more GPU workloads 922 at the one of the plurality of granularities. Further, the processing unit 120 in FIG. 1 may perform the operation 1006.

Figure 11:
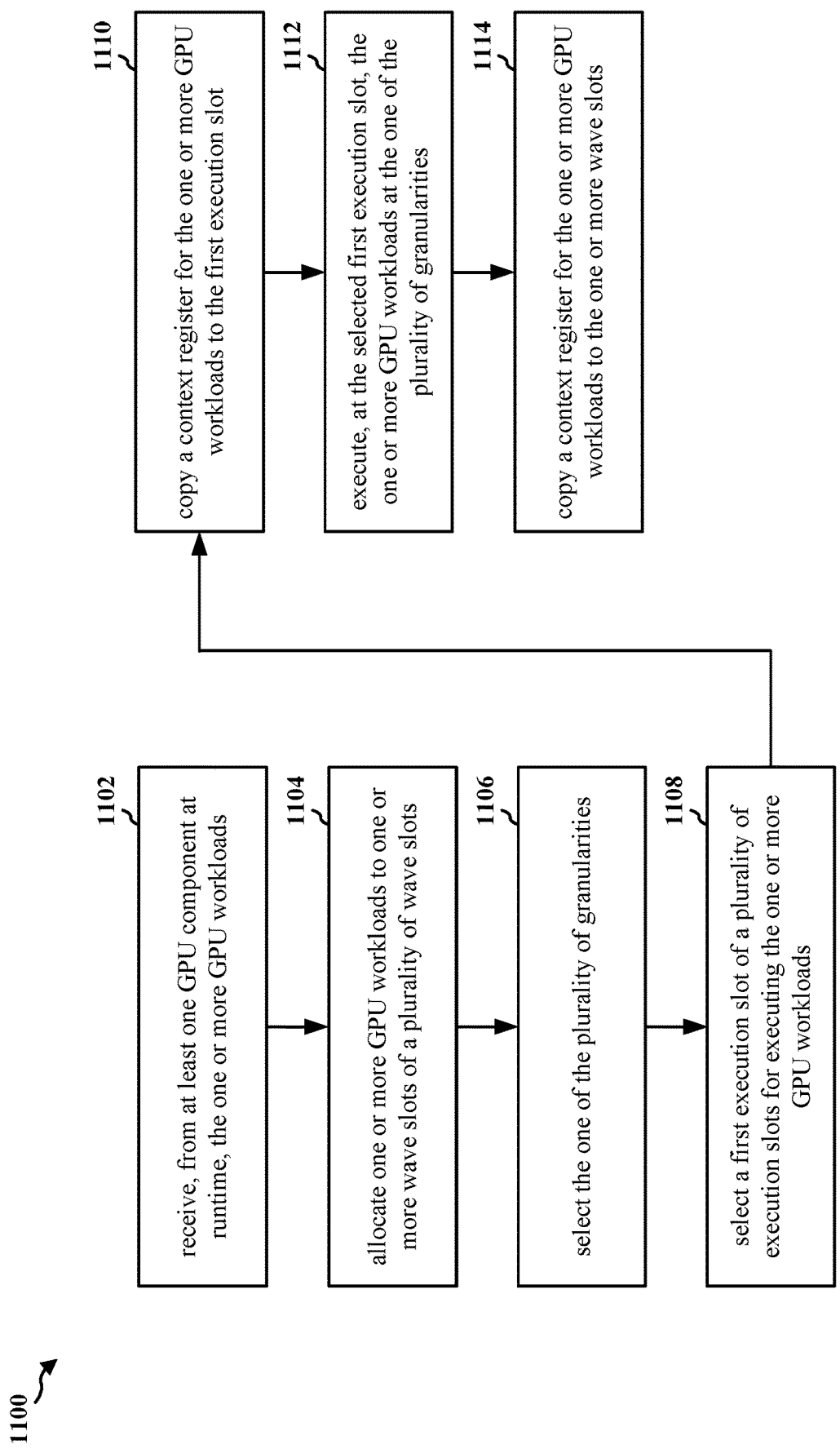
FIG. 11 is a flowchart of an example method of graphics processing in accordance with one or more techniques of this disclosure.

FIG. 11 is a flowchart 1100 of an example method of graphics processing in accordance with one or more techniques of this disclosure. The method may be performed by an apparatus, such as an apparatus for graphics processing, a GPU, a CPU, a wireless communication device, and the like, as used in connection with the aspects of FIGS. 1-3 and 6-8.

At 1102, the apparatus may receive, from at least one GPU component at runtime, the one or more GPU workloads, as described in connection with the examples in FIGS. 3 and 6-8. Referring to FIG. 9, at 920, the GPU component 902 may receive, from at least one GPU component 904 at runtime, the one or more GPU workloads 922. Further, the processing unit 120 in FIG. 1 may perform the operation 1102.

In one configuration, each GPU workload of the one or more GPU workloads may include a uniform number of fibers.

At 1104, the apparatus may allocate one or more GPU workloads to one or more wave slots of a plurality of wave slots, as described in connection with the examples in FIGS. 3 and 6-8. Referring to FIG. 9, at 930, the GPU component 902 may allocate one or more GPU workloads 922 to one or more wave slots of a plurality of wave slots. Further, the processing unit 120 in FIG. 1 may perform the operation 1104.

In one configuration, the plurality of wave slots may include a plurality of first wave slots and a plurality of second wave slots. The one or more GPU workloads may be allocated based on the plurality of first wave slots and the plurality of second wave slots.

In one configuration, a first GPU workload of the one or more GPU workloads may be allocated to a first wave slot of the plurality of first wave slots. A second GPU workload of the one or more GPU workloads may be allocated to a second wave slot of the plurality of second wave slots. In one configuration, the first GPU workload and the second GPU workload may be consecutive in sequence. In one configuration, the first GPU workload and the second GPU workload may be associated with a same instruction.

In one configuration, each wave slot of the plurality of wave slots may be associated with one set of GPRs of a plurality of GPRs.

At 1106, the apparatus may select the one of the plurality of granularities based on whether the one or more GPU workloads are associated with or are unassociated with a texture block or a branching block, as described in connection with the examples in FIGS. 3 and 6-8. Referring to FIG. 9, at 940, the GPU component 902 may select the one of the plurality of granularities based on whether the one or more GPU workloads 922 are associated with or are unassociated with a texture block or a branching block. Further, the processing unit 120 in FIG. 1 may perform the operation 1106.

In one configuration, a first granularity may be selected as the one of the plurality of granularities when the one or more GPU workloads are associated with the texture block or the branching block. In one configuration, a second granularity may be selected as the one of the plurality of granularities when the one or more GPU workloads are unassociated with the texture block or the branching block. The first granularity may be smaller than the second granularity.

At 1108, the apparatus may select a first execution slot of a plurality of execution slots for executing the one or more GPU workloads, as described in connection with the examples in FIGS. 3 and 6-8. The selection may be based on one of a plurality of granularities. Referring to FIG. 9, at 950, the GPU component 902 may select a first execution slot of a plurality of execution slots for executing the one or more GPU workloads 922. Further, the processing unit 120 in FIG. 1 may perform the operation 1108.

At 1110, the apparatus may copy a context register for the one or more GPU workloads to the first execution slot, as described in connection with the examples in FIGS. 3 and 6-8. Referring to FIG. 9, at 960, the GPU component 902 may copy a context register for the one or more GPU workloads 922 to the first execution slot. Further, the processing unit 120 in FIG. 1 may perform the operation 1110.

In one configuration, the context register for the one or more GPU workloads may be associated with a context state of the one or more GPU workloads.

At 1112, the apparatus may execute, at the selected first execution slot, the one or more GPU workloads at the one of the plurality of granularities, as described in connection with the examples in FIGS. 3 and 6-8. Referring to FIG. 9, at 970, the GPU component 902 may execute, at the selected first execution slot, the one or more GPU workloads 922 at the one of the plurality of granularities. Further, the processing unit 120 in FIG. 1 may perform the operation 1112.

At 1114, the apparatus may copy a context register for the one or more GPU workloads to the one or more wave slots, as described in connection with the examples in FIGS. 3 and 6-8. Referring to FIG. 9, at 980, the GPU component 902 may copy a context register for the one or more GPU workloads to the one or more wave slots. Further, the processing unit 120 in FIG. 1 may perform the operation 1114.

In configurations, a method or an apparatus for graphics processing is provided. The apparatus may be a GPU, a CPU, or some other processor that may perform graphics processing. In aspects, the apparatus may be the processing unit 120 within the device 104, or may be some other hardware within the device 104 or another device. The apparatus may include means for allocating one or more GPU workloads to one or more wave slots of a plurality of wave slots. The apparatus may further include means for selecting a first execution slot of a plurality of execution slots for executing the one or more GPU workloads. The apparatus may further include means for executing, at the selected first execution slot, the one or more GPU workloads at the one of the plurality of granularities. The apparatus may further include means for dividing the plurality of wave slots into a plurality of first wave slots and a plurality of second wave slots. The apparatus may further include means for receiving, from at least one GPU component, the one or more GPU workloads. The apparatus may further include means for selecting the one of the plurality of granularities based on whether the one or more GPU workloads are associated with or are unassociated with a texture block or a branching block. The apparatus may further include means for copying a context register for the one or more GPU workloads to the first execution slot. The apparatus may further include means for copying a context register for the one or more GPU workloads to the one or more wave slots.

Referring back to FIGS. 3 and 6-10, a graphics processor may allocate one or more GPU workloads to one or more wave slots of a plurality of wave slots. The graphics processor may select a first execution slot of a plurality of execution slots for executing the one or more GPU workloads. The selection may be based on one of a plurality of granularities. The graphics processor may execute, at the selected first execution slot, the one or more GPU workloads at the one of the plurality of granularities. Accordingly, the compiler's role in selecting the wave size may be eliminated. A uniform 1× wave granularity in GPR allocation may be used. The technique may be simple and robust, and may enable out-of-order (OoO) retirement of GPR slots at the 1× wave granularity. A GPR slot may be released when one wave in the super wave mode is killed. OoO retirement may be enabled when execution is completed on one wave in the super wave mode (which may not be possible with the conventional 2× wave). The wave size may be changed dynamically per instruction during execution time. Accordingly, the instruction fetch may be more efficient as a single instruction may be executed for two different waves. Memory and cache utilization may be more efficient as texture processing and load/store operations may be executed on paired waves to a single region in close proximity. For example, processing a wave with 64 fibers (e.g., an 8×8 tile) is less likely to cause data threshing in the L1 data cache compared to processing a wave with 128 fibers (e.g., an 8×16 tile). 16 bit operations may be executed at the 2× rate when waves are paired, as in a single cycle an instruction may issue across 2 waves. At the cost of a small increase in the GPU area, techniques described herein may deliver a comparatively significant GPU performance increase.

It is understood that the specific order or hierarchy of blocks/steps in the processes, flowcharts, and/or call flow diagrams disclosed herein is an illustration of example approaches. Based upon design preferences, it is understood that the specific order or hierarchy of the blocks/steps in the processes, flowcharts, and/or call flow diagrams may be rearranged. Further, some blocks/steps may be combined and/or omitted. Other blocks/steps may also be added. The accompanying method claims present elements of the various blocks/steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

Computer-readable media may include computer data storage media or communication media including any medium that facilitates transfer of a computer program from one place to another. In this manner, computer-readable media generally may correspond to: (1) tangible computer-readable storage media, which is non-transitory; or (2) a communication medium such as a signal or carrier wave. Data storage media may be any available media that can be accessed by one or more computers or one or more processors to retrieve instructions, code, and/or data structures for implementation of the techniques described in this disclosure. By way of example, and not limitation, such computer-readable media may comprise RAM, ROM, EEPROM, compact disc-read only memory (CD-ROM), or other optical disk storage, magnetic disk storage, or other magnetic storage devices. Disk and disc, as used herein, includes compact disc (CD), laser disc, optical disc, digital versatile disc (DVD), floppy disk, and Blu-ray disc, where disks usually reproduce data magnetically, while discs usually reproduce data optically with lasers. Combinations of the above should also be included within the scope of computer-readable media. A computer program product may include a computer-readable medium.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and configured to allocate one or more GPU workloads to one or more wave slots of a plurality of wave slots; select a first execution slot of a plurality of execution slots for executing the one or more GPU workloads, the selection being based on one of a plurality of granularities; and execute, at the selected first execution slot, the one or more GPU workloads at the one of the plurality of granularities.

Aspect 2 is the apparatus of aspect 1, where the plurality of wave slots include a plurality of first wave slots and a plurality of second wave slots, the one or more GPU workloads are allocated based on the plurality of first wave slots and the plurality of second wave slots, and a first GPU workload of the one or more GPU workloads is allocated to a first wave slot of the plurality of first wave slots and a second GPU workload of the one or more GPU workloads is allocated to a second wave slot of the plurality of second wave slots.

Aspect 3 is the apparatus of aspect 2, where the first GPU workload and the second GPU workload are consecutive in sequence.

Aspect 4 is the apparatus of any of aspects 2 and 3, where the first GPU workload and the second GPU workload are associated with a same instruction.

Aspect 5 is the apparatus of any of aspects 1-4, the at least one processor being further configured to: receive, from at least one GPU component at runtime, the one or more GPU workloads.

Aspect 6 is the apparatus of any of aspects 1-5, the at least one processor being further configured to: select the one of the plurality of granularities based on whether the one or more GPU workloads are associated with or are unassociated with a texture block or a branching block.

Aspect 7 is the apparatus of aspect 6, where a first granularity is selected as the one of the plurality of granularities when the one or more GPU workloads are associated with the texture block or the branching block.

Aspect 8 is the apparatus of aspect 7, where a second granularity is selected as the one of the plurality of granularities when the one or more GPU workloads are unassociated with the texture block or the branching block, the first granularity being smaller than the second granularity.

Aspect 9 is the apparatus of any of aspects 1-8, the at least one processor being further configured to: copy a context register for the one or more GPU workloads to the first execution slot, where the context register for the one or more GPU workloads is associated with a context state of the one or more GPU workloads.

Aspect 10 is the apparatus of any of aspects 1-9, the at least one processor being further configured to: copy a context register for the one or more GPU workloads to the one or more wave slots.

Aspect 11 is the apparatus of any of aspects 1-10, where each GPU workload of the one or more GPU workloads includes a uniform number of fibers.

Aspect 12 is the apparatus of any of aspects 1-11, where each wave slot of the plurality of wave slots is associated with one set of GPRs of a plurality of GPRs.

Aspect 13 is the apparatus of any of aspects 1-12, where the apparatus is a wireless communication device.

Aspect 15 is a method of wireless communication for implementing any of aspects 1-13.

Aspect 16 is an apparatus for graphics processing including means for implementing a method as in any of aspects 1-13.

Aspect 17 is a computer-readable medium storing computer executable code, the code when executed by at least one processor causes the at least one processor to implement a method as in any of aspects 1-13.

Various aspects have been described herein. These and other aspects are within the scope of the following claims.

What is claimed is:

1. An apparatus for graphics processing, comprising:
a memory; and
at least one processor coupled to the memory and configured to:
allocate one or more graphics processing unit (GPU) workloads to one or more wave slots of a plurality of wave slots;
select one of a plurality of granularities based on whether the one or more GPU workloads are associated with or are unassociated with a texture block or a branching block:
select a first execution slot of a plurality of execution slots for executing the one or more GPU workloads, the selection of the first execution slot being based on the one of the plurality of granularities; and
execute, at the selected first execution slot, the one or more GPU workloads at the one of the plurality of granularities.

2. The apparatus of claim 1, wherein the plurality of wave slots comprise a plurality of first wave slots and a plurality of second wave slots, the one or more GPU workloads are allocated based on the plurality of first wave slots and the plurality of second wave slots, and a first GPU workload of the one or more GPU workloads is allocated to a first wave slot of the plurality of first wave slots and a second GPU workload of the one or more GPU workloads is allocated to a second wave slot of the plurality of second wave slots.

3. The apparatus of claim 2, wherein the first GPU workload and the second GPU workload are consecutive in sequence.

4. The apparatus of claim 2, wherein the first GPU workload and the second GPU workload are associated with a same instruction.

5. The apparatus of claim 1, the at least one processor being further configured to:
receive, from at least one GPU component at runtime, the one or more GPU workloads.

6. The apparatus of claim 1, wherein a first granularity is selected as the one of the plurality of granularities when the one or more GPU workloads are associated with the texture block or the branching block.

7. The apparatus of claim 6, wherein a second granularity is selected as the one of the plurality of granularities when the one or more GPU workloads are unassociated with the texture block or the branching block, the first granularity being smaller than the second granularity.

8. The apparatus of claim 1, the at least one processor being further configured to:
copy a context register for the one or more GPU workloads to the first execution slot, wherein the context register for the one or more GPU workloads is associated with a context state of the one or more GPU workloads.

9. The apparatus of claim 1, the at least one processor being further configured to:
copy a context register for the one or more GPU workloads to the one or more wave slots.

10. The apparatus of claim 1, wherein each GPU workload of the one or more GPU workloads includes a uniform number of fibers.

11. The apparatus of claim 1, wherein each wave slot of the plurality of wave slots is associated with one set of general purpose registers (GPRs) of a plurality of GPRs.

12. The apparatus of claim 1, wherein the apparatus is a wireless communication device.

13. A method of graphics processing, comprising:
allocating one or more graphics processing unit (GPU) workloads to one or more wave slots of a plurality of wave slots;
selecting one of a plurality of granularities based on whether the one or more GPU workloads are associated with or are unassociated with a texture block or a branching block;
selecting a first execution slot of a plurality of execution slots for executing the one or more GPU workloads, the selection of the first execution slot being based on the one of the plurality of granularities; and
executing, at the selected first execution slot, the one or more GPU workloads at the one of the plurality of granularities.

14. The method of claim 13, wherein the plurality of wave slots comprise a plurality of first wave slots and a plurality of second wave slots, the one or more GPU workloads are allocated based on the plurality of first wave slots and the plurality of second wave slots, and a first GPU workload of the one or more GPU workloads is allocated to a first wave slot of the plurality of first wave slots and a second GPU workload of the one or more GPU workloads is allocated to a second wave slot of the plurality of second wave slots.

15. The method of claim 14, wherein the first GPU workload and the second GPU workload are consecutive in sequence.

16. The method of claim 14, wherein the first GPU workload and the second GPU workload are associated with a same instruction.

17. The method of claim 13, further comprising:
receiving, from at least one GPU component, the one or more GPU workloads.

18. The method of claim 13, wherein a first granularity is selected as the one of the plurality of granularities when the one or more GPU workloads are associated with the texture block or the branching block.

19. The method of claim 18, wherein a second granularity is selected as the one of the plurality of granularities when the one or more GPU workloads are unassociated with the texture block or the branching block, the first granularity being smaller than the second granularity.

20. The method of claim 13, further comprising:
copying a context register for the one or more GPU workloads to the first execution slot, wherein the context register for the one or more GPU workloads is associated with a context state of the one or more GPU workloads.

21. The method of claim 13, further comprising:
copying a context register for the one or more GPU workloads to the one or more wave slots.

22. The method of claim 13, wherein each GPU workload of the one or more GPU workloads includes a uniform number of fibers.

23. The method of claim 13, wherein each wave slot of the plurality of wave slots is associated with one set of general purpose registers (GPRs) of a plurality of GPRs.

24. A non-transitory computer-readable medium storing computer executable code, the code when executed by at least one processor, causes the at least one processor to:
allocate one or more graphics processing unit (GPU) workloads to one or more wave slots of a plurality of wave slots;
select one of a plurality of granularities based on whether the one or more GPU workloads are associated with or are unassociated with a texture block or a branching block;
select a first execution slot of a plurality of execution slots for executing the one or more GPU workloads, the selection of the first execution slot being based on the one of the plurality of granularities; and
execute, at the selected first execution slot, the one or more GPU workloads at the one of the plurality of granularities.

25. The non-transitory computer-readable medium of claim 24, wherein the plurality of wave slots comprise a plurality of first wave slots and a plurality of second wave slots, the one or more GPU workloads are allocated based on the plurality of first wave slots and the plurality of second wave slots, and a first GPU workload of the one or more GPU workloads is allocated to a first wave slot of the plurality of first wave slots and a second GPU workload of the one or more GPU workloads is allocated to a second wave slot of the plurality of second wave slots.

26. The non-transitory computer-readable medium of claim 25, wherein the first GPU workload and the second GPU workload are consecutive in sequence.

27. The non-transitory computer-readable medium of claim 25, wherein the first GPU workload and the second GPU workload are associated with a same instruction.

28. The non-transitory computer-readable medium of claim 24, wherein the code further causes the at least one processor to:
receive, from at least one GPU component, the one or more GPU workloads.

29. The non-transitory computer-readable medium of claim 24, wherein a first granularity is selected as the one of the plurality of granularities when the one or more GPU workloads are associated with the texture block or the branching block, and wherein a second granularity is selected as the one of the plurality of granularities when the one or more GPU workloads are unassociated with the texture block or the branching block, the first granularity being smaller than the second granularity.

30. The non-transitory computer-readable medium of claim 24, wherein each GPU workload of the one or more GPU workloads includes a uniform number of fibers.

\* \* \* \* \*